3,386,803
PREPARATION OF HYDROXYLAMINE AND ALDEHYDES FROM ALKALI METAL SALTS OF PRIMARY NITROPARAFFINS AND ORGANIC ACIDS

Lawrence R. Jones, Terre Haute, Ind., assignor to Commercial Solvents Corporation, New York, N.Y., a corporation of Maryland
No Drawing. Filed July 6, 1965, Ser. No. 469,927
12 Claims. (Cl. 23—190)

ABSTRACT OF THE DISCLOSURE

A process for preparing hydroxylamine and aldehyde by reacting a water-soluble alkali metal salt of a primary nitroparaffin, for example the alkali metal salt of 1-nitropropane, with formic acid or oxalic acid.

---

This invention relates to a process for the production of hydroxylamine and aldehyde. In a particular aspect this invention relates to a process for the production of hydroxylamine and aldehyde by the reaction of a water-soluble alkali metal salt of a primary nitroparaffin with an organic acid selected from the group consisting of formic acid and oxalic acid.

In U.S. Patent 2,381,410, issued Aug. 7, 1945, it is disclosed that hydroxylamine and monocarboxylic acid are obtained by heating a primary nitroparaffin and hydrochloric acid under reflux conditions in the presence of a monocarboxylic acid. Acetic acid, propionic acid and butyric acid are specifically mentioned for use in the process. It is stated in the patent that the monocarboxylic acid serves principally as a solvent for the nitroparaffin and the hydrochloric acid. It is also known to react the sodium salt of nitrocyclohexane with formic acid in the presence of a reducing agent such as sulfur dioxide to form cyclohexanone oxime.

It is an object of the present invention to provide a process for the production of hydroxylamine and aldehyde.

Further objects and advantages of the present invention will be apparent from the specification and the appended claims.

It has been discovered in accordance with the present invention that hydroxylamine and aldehyde are obtained by reacting a water-soluble alkali metal salt of a primary nitroparaffin (hereinafter referred to as nitroparaffin salt) with an organic acid selected from the group consisting of formic acid and oxalic acid without the use of a mineral acid in the reaction step. The reaction of the present invention results in the conversion of the nitroparaffin salt to the corresponding aldehyde and to hydroxylamine. The reaction is illustrated as follows

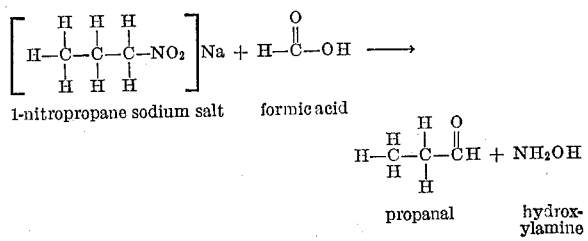

The process of the present invention is advantageous in that it is conveniently conducted at room temperature, thereby avoiding the need for the reflux temperatures and equipment employed in the prior art process. The use of hydrochloric acid in the reaction step is not required. Acetic acid, propionic acid, butyric acid and other higher monocarboxylic acids are not successfully employed as the organic acid of use in the present invention.

The term "primary nitroparaffin" means a nitroparaffin wherein the nitro group is bonded to a carbon atom which is in turn bonded to at least two hydrogen atoms. Typical primary nitroparaffins are represented by the formula R—$NO_2$ wherein R is an alkyl radical having from one up to about seven carbon atoms. Representative primary nitroparaffins include nitromethane, nitroethane, 1-nitropropane, 1-nitrobutane, 1-nitropentane, 1-nitroheptane, 1-nitrohexane, etc., and the like. Aldehydes prepared from alkali metal salts of such primary nitroparaffins are represented by the formula

wherein R' is an alkyl radical having from one up to about six carbon atoms. Representative aldehydes include methanal, ethanal, propanal, butanal, etc., and the like.

The nitroparaffin salts of use in the present invention may be prepared by any suitable method. For example, 1 mole of 1-nitropropane may be dissolved in an aqueous or a methanolic solution containing 1 mole of sodium hydroxide to obtain the sodium salt of 1-nitropropane. In a similar manner the potassium salt of the nitroparaffin may be prepared by utilizing potassium hydroxide.

The reaction of the present invention may be carried out in any suitable manner. When oxalic acid is employed as the organic acid of the process, use of an inert solvent is required. When formic acid is employed use of an inert solvent is preferred but none is required. For the purpose of this invention the term "inert solvent" is taken to mean a solvent inert to both the reactants and the reaction products. Suitable inert solvents for employment with formic acid include cyclohexane, chloroform, methanol, carbon tetrachloride, the paraffin hydrocarbons such as hexane and pentane, etc., and the like. Suitable inert solvents for use with oxalic acid include water, methanol, ethanol, propanol, butanol, etc., and the like. Methanol is the preferred solvent for use in the process. It is preferred to employ a range by weight of reactants to inert solvent of about 1:1 to about 1:20.

The organic acids of use in the present invention may be of any suitable form. For example, the organic acids may be in anhydrous or in aqueous form. It is preferred when aqueous formic acid is the acid of the process that the concentration of the acid be in excess of 70 percent.

The mole ratio of organic acid to nitroparaffin salt is of importance in the present invention. While hydroxylamine and aldehyde are obtained at lower ratios, best results are obtained when the mol ratio of organic acid to nitroparaffin salt is in excess of 1:1, for example in the range of 2:1 to 5:1.

The reaction of the present invention is exothermic and requires no external source of heat. As previously pointed out the reaction is advantageous in that it can be conducted at room temperature, however suitable higher or lower temperatures may be employed. Typically the reaction is carried out at a temperature in the range of from about 15 to about 100° C.

The hydroxylamine produced according to the process of the present invention may be separated from the aldehyde by any suitable procedure and recovered in any suitable form. For example hydroxylamine may be recovered as free hydroxylamine by neutralization of the reaction medium with the hydroxide of an alkali metal such as sodium hydroxide followed by distillation to remove the free hydroxylamine from the reaction medium. The hydroxylamine may be precipitated from the reaction medium as the salt of the organic acid by cooling and concentrating the reaction medium. The hydroxylamine may also be recovered as the salt of a strong mineral acid such as hydroxylammonium acid sulfate or hydroxylamine hydrochloride by methods well known to the art.

The invention will be understood more fully by reference to the specific examples. It is understood that the examples are presented for purposes of illustration only and are not intended as a limitation of the invention.

EXAMPLE 1

10 grams of 1-nitropropane and 4 grams of sodium hydroxide as pellets were added to 100 milliliters of water to form a solution. The solution was then slowly added to 50 milliliters of anhydrous formic acid to form a reaction medium having a temperature of 25° C. The reaction medium was then agitated for 90 minutes during which time no external source of heat was applied. At the end of the 90 minute period aqueous hydrochloric acid was added to the reaction medium. Propanal was recovered from the reaction medium by distillation. The distilled reaction medium was then evaporated to dryness under vacuum. Hydroxylamine as the hydrochloride was obtained in a yield of 51 percent based on the 1-nitropropane starting material.

EXAMPLE 2

The procedure of Example 1 is repeated in all essential details with the exception that the sodium salt of 1-nitroethane is substituted for the sodium salt of 1-nitropropane. Ethanal and hydroxylamine are obtained.

EXAMPLE 3

The procedure of Example 1 is repeated in all essential details with the exception that the potassium salt of 1-nitrobutane is substituted for the sodium salt of 1-nitropropane. Butanal and hydroxylamine are obtained.

EXAMPLE 4

10 grams of 1-nitropropane and 4 grams of sodium hydroxide as pellets were added to 100 milliliters of water to form a solution. The solution was then slowly added to a solution of 25 grams of anhydrous oxalic acid in 200 milliliters of methanol to form a reaction medium having a temperature of about 25° C. The reaction medium was then agitated for 90 minutes during which time no external source of heat was applied. Propanal and hydroxylamine were obtained.

EXAMPLE 5

The procedure of Example 4 is repeated in all essential details with the exception that the sodium salt of 1-nitroheptane is substituted for the sodium salt of 1-nitropropane. Hydroxylamine and heptanal are obtained.

EXAMPLE 6

The procedure of Example 4 is repeated in all essential details with the exception that the potassium salt of 1-nitrohexane is substituted for the sodium salt of 1-nitropropane. Hydroxylamine and hexanal are obtained.

Since many embodiments may be made of this invention and since many changes may be made in the embodiments described, the foregoing is to be interpreted as illustrative only and the invention is defined by the claims appended hereto.

I claim:

1. A process for the production of hydroxylamine and aldehyde which comprises reacting a water-soluble alkali metal salt of a primary nitroparaffin with an organic acid selected from the group consisting of formic acid and oxalic acid to form hydroxylamine and aldehyde and separating the hydroxylamine from the aldehyde.

2. The process of claim 1 wherein the reaction is carried out in the presence of an inert solvent.

3. The process of claim 2 wherein the solvent is methanol.

4. A process for the production of hydroxylamine and aldehyde which comprises reacting a water-soluble alkali metal salt of a primary nitroparaffin with an organic acid selected from the group consisting of formic acid and oxalic acid, the said nitroparaffin having the formula R—NO$_2$ wherein R is an alkyl radical having 1 up to about 7 carbon atoms, at a temperature in the range of from about 15 to about 100° C. to form hydroxylamine and aldehyde and separating the hydroxylamine from the aldehyde.

5. The process of claim 4 wherein the organic acid is formic acid.

6. The process of claim 4 wherein the reaction is carried out in the presence of an inert solvent.

7. The process of claim 6 wherein the organic acid is oxalic acid.

8. The process of claim 6 wherein the organic acid is formic acid.

9. The process of claim 8 wherein the concentration of the formic acid is in the range of about 70 to 100%.

10. The process of claim 6 wherein the solvent is methanol.

11. The process of claim 4 wherein the mole ratio of organic acid to nitroparaffin salt is in the range of about 1:1 to about 5:1.

12. The process of claim 4 wherein the water-soluble alkali metal salt of primary nitroparaffin is the sodium salt of 1-nitropropane.

References Cited

UNITED STATES PATENTS 2,381,410 8/1945 Tryon _____ 23—190
2,755,171 7/1956 Jones _____ 23—190

OSCAR R. VERTIZ, Primary Examiner.
H. S. MILLER, Assistant Examiner.